United States Patent
Hauschild et al.

(10) Patent No.: US 10,139,988 B2
(45) Date of Patent: Nov. 27, 2018

(54) METHOD AND DEVICE FOR DISPLAYING INFORMATION ARRANGED IN LISTS

(75) Inventors: Frank Hauschild, Berlin (DE); Mathias Kuhn, Berlin (DE); Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 437 days.

(21) Appl. No.: 13/285,895

(22) Filed: Oct. 31, 2011

(65) Prior Publication Data

US 2012/0072864 A1   Mar. 22, 2012

Related U.S. Application Data

(63) Continuation of application No. PCT/EP2010/055749, filed on Apr. 28, 2010.

(30) Foreign Application Priority Data

Apr. 30, 2009   (DE) .................. 10 2009 019 563

(51) Int. Cl.
*G06F 3/048* (2013.01)
*G06F 3/0482* (2013.01)
(Continued)

(52) U.S. Cl.
CPC ............ *G06F 3/0482* (2013.01); *B60K 35/00* (2013.01); *B60K 37/06* (2013.01); *B60K 2350/1024* (2013.01); *B60K 2350/1028* (2013.01)

(58) Field of Classification Search
CPC .... G06F 3/0481; G06F 3/0489; G06F 3/9443; G06F 9/4443; G06F 3/0485;
(Continued)

(56) References Cited

U.S. PATENT DOCUMENTS 5,270,689 A    12/1993  Hermann
6,121,960 A *  9/2000   Carroll .................. G06F 1/1626
                                                      345/169

(Continued)

FOREIGN PATENT DOCUMENTS

CN    1553379 A    12/2004
DE    199 41 956    3/2001
(Continued)

OTHER PUBLICATIONS

International Search Report, dated Sep. 1, 2010, issued in corresponding International Appln. No. PCT/EP2010/055749.
(Continued)

*Primary Examiner* — Kieu D Vu
*Assistant Examiner* — Asteway T Gattew
(74) *Attorney, Agent, or Firm* — Hunton Andrews Kurth LLP

(57) ABSTRACT

In a method for displaying information arranged in lists, a portion of a list is displayed in a display area, which includes a plurality of list entries, multiple elements being associated at least in part with the list entries, the displayed portion of the list being modifiable by a scrolling action such that previous and subsequent list entries are displayable in succession, and, when a list entry is selected, this list entry is displayed together with at least a portion of the elements that are associated with the list entry. If a selected list entry is displayed together with at least a portion of the elements associated with the selected list entry and the scrolling action is performed, first previous or subsequent elements are displayed in succession and thereupon list entries preceding or following the selected list entry are displayed. A device is configured for implementing the method.

21 Claims, 3 Drawing Sheets

(51) Int. Cl.
*B60K 35/00* (2006.01)
*B60K 37/06* (2006.01)

(58) Field of Classification Search
CPC ....... G06F 3/0482; B60K 35/00; B60K 37/06; B60K 2350/1024; B60K 2350/1028
USPC .................................................. 715/783, 784
See application file for complete search history.

(56) References Cited

U.S. PATENT DOCUMENTS

| | | | |
|---|---|---|---|
| 6,380,957 B1 * | 4/2002 | Banning .................. | 715/828 |
| 6,747,680 B1 | 6/2004 | Igarashi et al. | |
| 6,769,320 B1 | 8/2004 | Bollgohn et al. | |
| 2002/0039915 A1 | 4/2002 | Hama et al. | |
| 2004/0135773 A1 * | 7/2004 | Bang et al. .................. | 345/173 |
| 2006/0271870 A1 * | 11/2006 | Anwar .................. | G06F 3/0481 |
| | | | 715/764 |
| 2007/0132789 A1 | 6/2007 | Ording et al. | |
| 2007/0150189 A1 * | 6/2007 | Han .............. | 701/212 |
| 2007/0182718 A1 | 8/2007 | Schoener et al. | |
| 2007/0198476 A1 | 8/2007 | Farago et al. | |
| 2008/0059909 A1 * | 3/2008 | Parada et al. ................. | 715/841 |
| 2008/0094370 A1 | 4/2008 | Ording et al. | |
| 2009/0109182 A1 * | 4/2009 | Fyke et al. .................... | 345/173 |
| 2009/0160807 A1 * | 6/2009 | Chang ................ | G06F 3/03547 |
| | | | 345/173 |
| 2010/0134425 A1 * | 6/2010 | Storrusten ............ | G06F 3/0425 |
| | | | 345/173 |
| 2010/0159892 A1 * | 6/2010 | Dunnam et al. .............. | 455/413 |
| 2010/0251167 A1 * | 9/2010 | DeLuca ................ | G06F 3/0485 |
| | | | 715/786 |

FOREIGN PATENT DOCUMENTS

| | | |
|---|---|---|
| DE | 199 41 960 | 3/2001 |
| DE | 199 44 324 | 3/2001 |
| DE | 103 24 579 | 12/2004 |
| DE | 10 2005 020 155 | 11/2006 |
| DE | 10 2006 032 118 | 1/2008 |
| DE | 20 2007 018 420 | 6/2008 |
| DE | 10 2007 034 272 | 1/2009 |
| EP | 0 366 132 | 5/1990 |
| EP | 1657627 A2 | 5/2006 |
| EP | 1 729 207 | 12/2006 |
| TW | 200828096 | 7/2008 |
| WO | 2005/015380 | 2/2005 |
| WO | 2007/059503 | 5/2007 |
| WO | 2008/047189 | 4/2008 |

OTHER PUBLICATIONS

Written Opinion, issued in corresponding International Appln. No. PCT/EP2010/055749.
International Preliminary Report on Patentability, issued in corresponding International Appln. No. PCT/EP2010/055749.

* cited by examiner

METHOD AND DEVICE FOR DISPLAYING INFORMATION ARRANGED IN LISTS

CROSS-REFERENCE TO RELATED APPLICATIONS

The present application is a continuation of PCT International Patent Application No. PCT/EP2010/055749, filed on Apr. 28, 2010, and claims priority to Application No. 10 2009 019 563.7, filed in the Federal Republic of Germany on Apr. 30, 2009, each of which is expressly incorporated herein in its entirety by reference thereto.

FIELD OF THE INVENTION

The present invention relates to a method for displaying information arranged in lists, in which a portion of a list is displayed in a display area, which includes a plurality of list entries, multiple elements being associated with the list entries, the displayed portion of the list being modifiable by a scrolling action such that previous and subsequent list entries are displayable in succession, and, when a list entry is selected, this list entry is displayed together with at least one portion, which contains elements that are associated with the list entry. The present invention furthermore relates to a device for displaying lists of arranged information having a display device with a display area. The device further includes a memory for storing a list, which includes a plurality of list entries, of which a portion is displayable in the display area, and for storing elements associated with the list entries. The device moreover includes an operating device, which may be operated by a user in order to modify the displayed portion of the list by a scrolling action, the list entries of the list being run through successively by the scrolling action, and a control unit, which is coupled with the operating device and the display device and by which the display represented in the display area may be controlled.

BACKGROUND INFORMATION

Traditionally, various items of information are displayed in a vehicle, which visually illustrate for the driver in particular the operational data of the vehicle. Furthermore, traffic-related data may be displayed for the driver in the vehicle. In the past, analog mechanical display instruments were used to display this information. These were arranged in particular within the so-called instrument cluster in the vicinity of the driver's primary field of view behind the steering wheel. The instrument cluster is used in particular to indicate the speed, the fuel level, the radiator temperature and other operational information of the vehicle.

With the increase of electronic devices in the vehicle it became necessary to display a greater quantity of information in the vehicle. Modern vehicles comprise for example a plurality of driver assistance systems, the information of which must be displayed in the vehicle. Furthermore, vehicles often include a navigation system. Such a navigation system is able to display digital geographic road maps including a route and possibly various additional information. Finally, modern vehicles often include communication and multimedia applications, including a mobile telephone interface and devices for playing back music and voice. These applications also require the possibility of displaying information in the vehicle.

For this reason, multifunction operating systems are used, which include one or more multifunction display(s) and operating elements, by which the manifold devices in the vehicle may be operated. For this purpose, the operation is supported or guided by the information represented on the multifunction display. Furthermore, it is possible to select via the operating system which information is to be displayed on the multifunction display.

In order to be able to display the manifold information in a flexible manner, freely programmable displays are used for example, which often also take over the display of traditional mechanical instruments. German Published Patent Application No. 10 2006 032 118 describes an instrument cluster for a motor vehicle for example, which includes a display that is able to indicate variably the speed of the motor vehicle, the rotational speed of the engine of the motor vehicle, the temperature of the engine of the motor vehicle, the fuel level and/or the time. Furthermore, it is possible to display information of a navigation system, a telephone, a music system, an infotainment system and/or an air conditioning system.

In addition to the instrument cluster, a display device is often situated above the center console of the vehicle, via which additional information may be displayed. This display device is used in particular as a multifunction display and for representing a geographic map of a navigation system. Such a multifunction display is described, for example, in German Published Patent Application No. 199 41 956.

The multifunction displays are operated in connection with an operating system that may comprise various operating elements. German Published Patent Application No. 199 41 956, for example, provides for multiple selection and function buttons for controlling the vehicle devices. German Published Patent Application No. 199 41 960 on the other hand describes a multifunction operating element for selecting function groups and individual functions, which includes a bidirectionally rotatable cylinder, which is furthermore movable perpendicular to the axis of rotation.

Furthermore, a multifunction operating device is described in European Published Patent Application No. 0 366 132, in which the selection of function groups and the selection of individual functions occurs by a rotary pushbutton, in which the switch may be operated in the direction of the axis of rotation. German Published Patent Application No. 199 44 324 describes a multifunction operating device having a rotary switch for selecting functions that are representable within a display area of a display. Pushbutton switches are situated around the rotary switch, which are also associated with display areas of the display. Finally, an operating device for controlling vehicle devices is described in German Published Patent Application No. 103 24 579, which has a touch-sensitive operating area.

Aside from the separated operating elements described above, there has also been a provision to equip the display itself with a touch-sensitive surface and in this manner to provide a so-called touch screen. Such a touch screen is operated in that the user touches the touch screen e.g. using his fingertip. The position of the touch is detected, evaluated and associated with an operating step. Virtual switches may be represented as graphical buttons on the display to assist the user in the operation. A display device having a touch-sensitive surface, which is used in connection with a navigation system, is described in German Published Patent Application No. 10 2005 020 155 for example. The display of information in a vehicle and the operation of the manifold devices of the vehicle entail very specific requirements. In the vehicle, it is the driver, among others, who takes in the information and performs the operations. The information should thus be represented in the vehicle such that while taking in the information the driver is not distracted from driving. The driver should therefore be able to grasp the represented information intuitively and quickly such that he has to take his eyes off the driving action only very briefly when taking in the information. Likewise, the operation of the vehicle devices should be as simple and intuitive as possible such that the driver is able to operate the devices even while driving. If the operation is supported or guided by a display, then the display should occur such that the driver has to view the display only very briefly in order to carry out the operation.

The representation of information in a vehicle often occurs in that a portion of the total information is displayed in the display area in the vehicle and that the user is able to change the portion. The total information may be a list having a plurality of list entries for example. A portion of the entries of the entire list is displayed. By an operator action, the user is able to produce a scrolling action so as to display other list entries. In the operator action, the user may perform for example an operator movement of a certain extent. The user may furthermore actuate an operating element for a certain operating duration. The magnitude or the measure of the change of the displayed information, i.e. in this case the number of items, by which the displayed list entries change, depends in this case on the extent of the operator movement or on the operating duration. The magnitude of this change furthermore depends on the magnification factor at which the list is displayed. For if e.g. four list entries are shown in a specific display area, the change of the displayed information is smaller at a specific extent of the operator movement or a specific operating duration than in the case in which six list entries are shown for the operator action in the respective display area. The operator action is especially intuitive for the user particularly if the extent of the operator movement determines the magnitude of the change of the list since the represented list is moved by the operator movement in a specific direction, the position of the displayed list entries changing less in the case of a greater magnification factor than in the case of a smaller magnification factor.

It should be noted that the magnification factor is relative to an arbitrarily selectable basic representation scale. The magnification factor may be greater than, smaller than or equal to one such that it also includes reduction relative to the basic scale.

If the total information comprises a very large quantity of data such as e.g. a very long list having many entries, this results in the problem that the operator action for scrolling to very distant list entries requires much time and attention on the part of the user. In the application in a vehicle, however, this is disadvantageous, as explained above.

If a list entry is selected in order to display the elements associated with the list entry, then the displayed information changes to a lower hierarchy level and shows the elements again in a list. If the display area is insufficient to display all elements, again only a portion of the elements will be displayed. The user is able to change the displayed portion of elements by a scrolling action. If the user wants to select another list entry, he must usually first navigate back to the list with the list entries and then select the desired list entry. The selection of another list entry therefore requires multiple operating steps. Therefore, this case also poses the problem that the operation requires much time and attention on the part of the driver, which is disadvantageous in the application in a vehicle.

SUMMARY

Example embodiments of the present invention provide a method and a device of the kind mentioned at the outset, in which various list entries may be selected simply and quickly, even when the elements associated with a list entry are displayed.

The method according to example embodiments of the present invention is characterized by the fact that, if a selected list entry is displayed together with at least a portion of the elements associated with the selected list entry and the scrolling action is performed, initially preceding or subsequent elements are displayed in succession and thereafter list entries preceding or following the selected list entry are displayed. In the method described herein, the user thus is not required to navigate back to the list with the list entries in order to be able to select a different list entry when the elements of a previously selected list entry are displayed. Rather, the elements of a selected list entry are inserted into the list with the list entries such that by the scrolling action it is possible to display and subsequently select other list entries directly. In this manner, the user is able to display and select other list entries more simply and quickly.

The list entries and/or the elements may be displayed successively in a linear representation. The list entries or the elements are displayed in particular one above the other or side by side in a plane.

If, in addition to a selected list entry, the elements associated with this list entry are displayed and a scrolling action is performed in this display, then the list entry following the selected list entry is displayed after the last element of the selected list entry.

According to the method described herein, starting from a display, in which a selected list entry is shown together with at least a portion of the elements associated with the selected list entry and subsequently another list entry is selected, the other list entry is displayed together with at least a portion of the elements associated with the other list entry. In this case, the elements of the previously selected list entry are no longer shown. For the scrolling operation, this ensures that the user must at most scroll through the elements of a single list entry and not through the elements of list entries that belong to previously selected list entries. This speeds up scrolling through the list with the list entries and the elements such that the user is able to reach other list entries more quickly.

By the scrolling action performed in the method, a user scrolls through the list entries and/or the elements of a selected list entry.

The number of displayed list entries and/or elements may depend on a magnification factor at which the list entries and/or elements are displayed in the display area. The magnitude of a change of the displayed information in the scrolling action depends on the magnification factor of the displayed information. The magnification factor for the operator action may change as a function of an operating situation. The magnification factor is in particular reduced such that a greater change of the displayed information results in an otherwise identical operator action, i.e. in particular in an identical extent of the operator movement or an identical operating duration.

The magnitude of the change of the displayed information correlates in particular with the speed of the change of the displayed portion of list entries or elements. In the case of a small magnification factor, i.e. a smaller representation of a specific quantity of information, the latter is changed to a greater degree or more quickly in the operator action than in the case of a greater magnification factor, i.e. in a larger representation of a specific quantity of information in the identical operator action. The displayed portion of list entries or elements may therefore be changed more quickly in that through the operating situation the magnification factor of the displayed information is reduced automatically for the operator action.

In traditional operator actions, the speed, with which the displayed portion of the total information changes in response to a user input, is constant. It is furthermore possible for the user to be able to increase the speed in that he actuates an operating device for a specific time permanently and without interruption. This manner of increasing the speed, with which the displayed portion changes, is disadvantageous in particular when used in a vehicle since the operating duration and thus the danger of distraction for a driver who actuates the operating device for this purpose increases. In addition, shocks and vibrations occurring in the vehicle make an uninterrupted actuation of the operating device difficult such that there is the danger that the operator action is interrupted involuntarily.

In the method described herein, the user is able to change the speed, with which the displayed portion changes, by an operating situation, which has the consequence that the magnification factor changes for the operator action, that it decreases in particular, such that the speed increases. The operating duration may thus be decreases substantially. This contributes towards guiding the vehicle safely.

It should be noted that the operator action itself does not refer to a change of the magnification factor of the information shown in the display area. The magnification factor is changed only for the operator action, which otherwise refers to the action of scrolling in the list. The change of the magnification factor is thus an aid to be able to scroll through the list entries or elements more quickly. For this reason, the magnification factor is reset to the original value in particular after the conclusion of the operator action, i.e. after the termination of the scrolling action. The operator action thus does not result in a different kind of representation after the conclusion of the scrolling action.

This aspect of the method thus provides the advantage of scaling down the list representation as a function of the operating situation when scrolling through a long list such that markedly more list entries are displayed in a specific display area. The operator movement or the operation duration of the operator action thus result in the list being scrolled through more quickly or in increasing the magnitude of the change of the displayed information per unit of time.

The magnitude of the change of the magnification factor may either be specified in a fixed manner or may also depend on the operating situation. It is furthermore possible for the magnification factor to be changed steplessly. The magnification factor may also be changed in steps.

The operating situation may be determined by the operator action. For the purpose of the operator action, a surface of the display area or a surface of an operating device may be touch-sensitive for example. In this case, the touch-sensitive surface is actuated in the operator action. The display area is thus part of a touch screen or the surface of the operating device is part of a touch pad. The operator action is performed in that the user touches the touch-sensitive surface of the display area or of the operating device at a specific position using the tip of his finger for example or performs a specific movement on the touch-sensitive surface.

Furthermore, the touch-sensitive surface of the display area or of the operating device may be arranged such that it is able to detect a simultaneous touch in different areas (a so-called multi-touch screen/touch pad). In this case, the operator action and/or the operating situation determined by the operator action may be a gesture performed on the touch-sensitive surface, in which the surface of the display area or of the operating device is touched simultaneously in at least two delimitable areas. It is also possible that a motion is performed for the two areas in the gesture. For example, two fingertips may be run over the surface of the display area or operating device in a specific manner.

The magnitude of the change of the magnification factor may be a function of the number of delimitable areas or the size of the area, in which the touch-sensitive surface of the display area is touched simultaneously in the operator action and/or the operating situation determined by the operator action. For example, if the touch-sensitive surface is touched simultaneously by two fingertips, then the magnification factor may be reduced less than if the touch-sensitive surface is touched simultaneously by more than two fingertips. Furthermore, the magnification factor may not change at all when the touch-sensitive surface is touched by only one fingertip.

The touch-sensitive surface of the display area or of the operating device may be touched simultaneously in two areas in the operator action, the areas being moved away from each other for increasing the magnification factor and the areas being moved towards each other for reducing the magnification factor. The gesture is in this case a so-called multi-touch zoom. In order to change the portion of list entries or elements as quickly as possible in this case, the two areas that are touched on the touch-sensitive surface are moved towards each other, whereby the magnification factor is reduced. This operator action at the same time has the effect that the displayed portion of list entries or elements is changed for the operator action in accordance with the new magnification factor.

The operating situation may be determined by an operator action, in which the touch-sensitive surface of the display area or the operating device is touched simultaneously in two areas for reducing the magnification factor. In order to change the displayed portion of list entries or elements, the areas on the surface are shifted in the operator action. In this case, the performed gesture of the operator action corresponds to a so-called multi-touch drag. The simultaneous touch of the surface of the display area or of the operating device is interpreted as an operating situation that results in a reduction of the magnification factor. The extent of the shift of the areas effects a change in the displayed portion of list entries or elements, the magnitude of which depends on the reduced magnification factor determined for the operator action as well as the extent of the shift of the areas. If, as described above, a portion of a list is shown for example, then the list may be touched using two fingers and shifted in the direction of the list entries that are to be displayed.

A mechanical operating element may be actuated in the operator action. In this case, the operating situation may be determined by an operator action, in which the mechanical operating element is actuated by a quick movement. If, as explained above, a touch-sensitive surface is actuated in the operator action, then the operating situation may be determined by an operator action, in which a quick movement is performed across the touch-sensitive surface of the display area. A "quick movement" in this case is understood as a specific actuation movement that is performed within a specified time such as e.g. 100 ms. If the mechanical operating element is a rotary actuator for example, then a quick actuation of the rotary actuator obtains if a defined number of increments of the rotary actuator have been run through within a specified time. Such a quick movement is interpreted in the method as an operating situation that results in a change of the magnification factor for the operator action. The measure of the change of the magnification factor may depend on the speed or the frequency of the actuation in the operator action.

The operating situation may be determined by an operator action, in which the mechanical operating element or the touch-sensitive surface of the display area or the operating device are actuated in an area for a long period of time. A "long period of time" in this case is understood as an actuation of the touch-sensitive surface or operating element lasting longer than a specified time interval of e.g. 100 ms. Such an actuation is then interpreted as an operating situation that results in a change of the magnification factor for the operator action. The measure of the change of the magnification factor may depend on the duration of the actuation.

The force exerted by the user in the operator action may be detected, and the operating situation that results in a change of the magnification factor may depend on the force exerted by the user in the operator action. The force exerted when touching the touch screen or the touch pad may be detected for example. Furthermore, it is possible to detect the force exerted by the user on a mechanical operating element when actuating this element. If this force exceeds a specific threshold value, this is interpreted as an operating situation in which the magnification factor is changed, in particular reduced. Furthermore, the force itself may determine the operator action. The magnitude of the change of the displayed portion of list entries or elements is determined as a function of the magnitude of the force.

In connection with this aspect of the method, the user is furthermore able to control the speed with which the displayed portion of list entries or elements changes via the force with which he actuates the operating device. This makes it possible to decrease the operating duration further. In addition, controlling the speed with which the displayed portion changes via the force exerted on the input device is intuitive for the user such that the user is able to carry out the operator action very easily.

If one further takes into account the surface on which the user exerts force, then it is also possible to detect the pressure exerted in the operator action, and the speed with which the displayed portion of list entries or elements changes depends in this case on the exerted pressure. No distinction is therefore made in the following between the variables of pressure and force.

The speed with which the displayed portion of list entries or elements is changed increases as the force exerted by the user in the operation increases. The user is thus able to increase the speed by pressing more forcefully on the operating device.

The force exertable in the operator action may be divided into ranges. The speed with which the displayed portion is changed depends in this case on the range within which the exerted force falls. The speed is in this case changed in steps when exceeding specific threshold values.

The speed with which the displayed portion is changed may depend on the exerted force in the following manner:

$$v = F \cdot D,$$

where v is the speed, F is the exerted force and D is an attenuation factor. There is thus a linear relationship between the exerted force and the speed with which the displayed portion of the list entries or elements is changed.

The operating situation may be determined by a driving-specific parameter. The speed of the vehicle may be measured for example. The operating situation depends in this case on the speed of the vehicle. At higher speeds, for example, the magnification factor may be reduced by a greater measure such that the measure of the change of the displayed information is greater in a specific operator action than at low speeds.

The device according to example embodiments of the present invention is characterized by the fact that the display area may be controlled by the control unit such that, if a selected list entry is displayed together with a portion of the elements associated with the selected list entry and the scrolling action is performed using the operating device, then initially previous or subsequent elements may be displayed in succession in the display area, and afterwards the list entries preceding or following the selected list entry may be displayed.

The device may be configured such that it is able to implement the method steps described above partially or entirely.

The operating device may include a touch-sensitive surface. This surface may be part of a so-called touch pad. Furthermore, the surface may be provided on the display area, i.e. the display device is equipped with a touch screen. The touch pad or touch screen may be arranged in particular as a multi-touch pad/touch screen, i.e. the touch-sensitive surface may be able to detect the simultaneous touch in different areas. For this purpose, the size of the area may be a function of the size of the area that is occupied by the touch of the fingertip of a user.

The operating device may furthermore include a mechanical operating element. This operating element is e.g. a mechanical rotary actuator, an operating element, which may be actuated in two dimensions, or a joystick, in order to shift the displayed portion in different directions in the display area.

The operating device may furthermore include a sensor for detecting the actuation speed of the mechanical operating element, for detecting the duration of the touch of the mechanical operating element and/or for detecting the release of the mechanical operating element. The operating device may include an infrared-based or capacitive touch sensor system for example.

The operating device may furthermore include a pressure-sensitive surface, which is able to detect the force exerted when actuating the operating device. The force may be detected resistively or capacitively for example. The pressure-sensitive surface may be provided on a touch screen or a touch pad such that the force may be detected in a spatially resolved manner, i.e. it is possible to detect in which location and, if applicable, on which surface the force is exerted on the touch-sensitive surface.

Example embodiments of the present invention are explained in more detail below with reference to the Figures.

DETAILED DESCRIPTION

Figure 1:
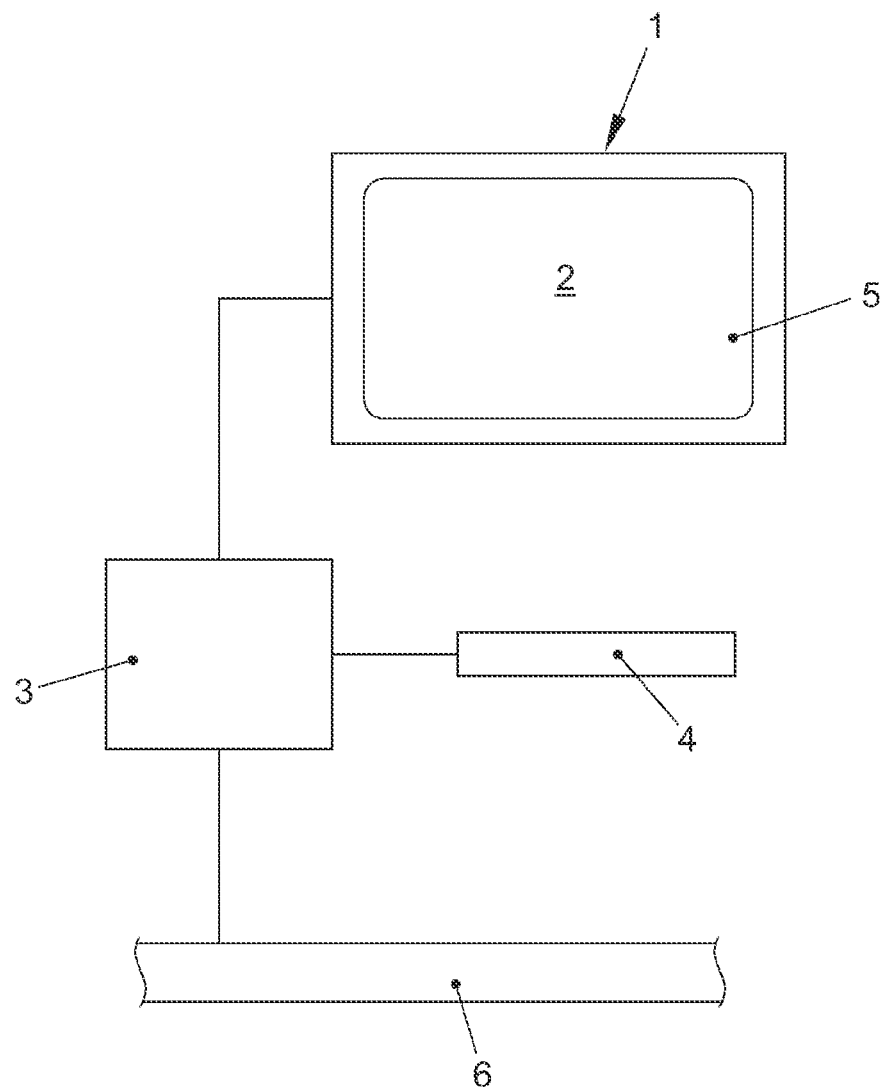
FIG. 1 schematically illustrates the construction of a device according to an example embodiment of the present invention and the coupling of this device with other devices of the vehicle.

The device for displaying information in a vehicle, in particular in a motor vehicle, includes a display device 1 having a display area 2, which is situated in the interior of the vehicle in such a way that it is highly visible by at least one vehicle occupant, in particular the driver. Display area 2 may be provided by a display, in particular a liquid crystal display, of any type of construction. The display device is coupled with a control unit 3.

Control unit 3 generates graphic data that may be displayed by display device 1. For this purpose, control unit 3 is connected to a memory 4 for storing data. The data include in particular information arranged in lists. The list includes a plurality of list entries. A portion of list entries may be displayed in display area 2 of display device 1, as will be explained later. At least for a part of the list entries, the data furthermore include elements associated with the respective list entry. Multiple elements may thus be associated with a particular list entry. The information is thus stored in a hierarchical structure.

Control unit 3 is furthermore part of an operating device that may be actuated by a user in order to change the displayed portion of list entries or elements by an operator action. In the exemplary embodiment shown in FIG. 1, the operator device includes a touch-sensitive surface 5 of display area 2. Display device 1 thus includes a touch screen. Moreover, touch-sensitive surface 5 of display area 2 is able to detect in particular the simultaneous touch of different areas. It is thus a so-called multi-touch screen.

Alternatively, the touch-sensitive surface may also be provided separately of display area 2. In this case, the operating device thus includes a touch pad.

Alternatively, the operating device may include a mechanical operating element that may be arranged e.g. as a rotary actuator. The mechanical operating element is coupled to control unit 3. Control unit 3 is arranged such that the user is able to change the information displayed in display area 2 by actuating surface 5 of display area 2 or of the mechanical operating element. By actuating touch-sensitive surface 5 or via the mechanical operating element, the user is able to change in particular the displayed portion of list entries or elements.

The mechanical operating element may also be a pushbutton switch, by which directions of movement may be controlled for changing the displayed information. Finally, the mechanical operating element may also be a digital or analog joystick.

When actuating touch-sensitive surface 5 or when actuating the mechanical operating element, control unit 3 is able to detect in particular the actuation speed, the actuation or touch duration and the release of surface 5 or of the operating element. Control unit 3 or the mechanical operating element include appropriate sensors for this purpose. This may be an infrared-based or capacitive touch sensor system for example. In the case of a mechanical operating element, a translatory or angular deflection may also be detected.

The operating device may include a pressure-sensitive surface, by which the force exerted in the actuation of the operating device may be detected. The pressure-sensitive surface may be a so-called touch pad. A surface of an operating element may furthermore include the pressure sensitive surface. Finally, display area 2 of display device 1 may have the pressure-sensitive surface such that the operating device in this case is a pressure-sensitive touch screen.

Control unit 3 is furthermore coupled to a vehicle bus 6, via which data may be exchanged with manifold devices of the vehicle. The current vehicle speed in particular may be transmitted to control unit 3 via vehicle bus 6.

Figure 2A:
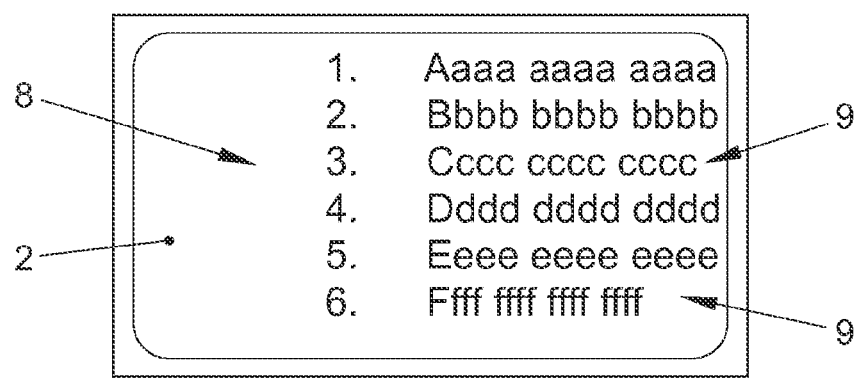
FIGS. 2A and 2B show displays of the display device according to the method of an example embodiment of the present invention.
Figure 2B:
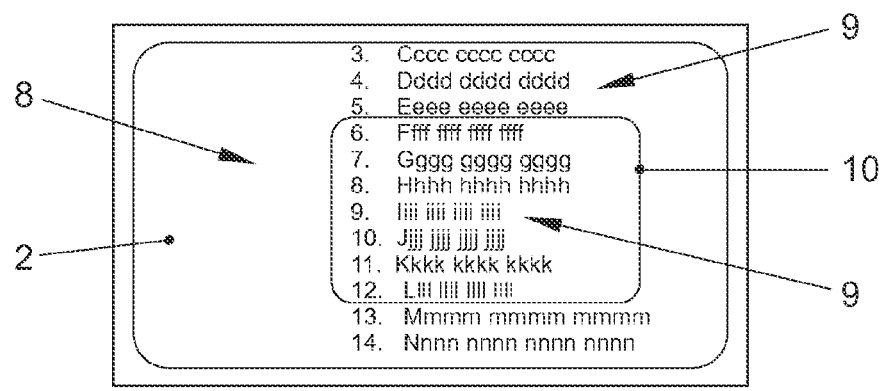

The following will explain with reference to FIGS. 2A and 2B how the displayed portion of a list is changed when scrolling in an exemplary embodiment of the method. The method may be carried out by the device described above.

This exemplary embodiment relates to the display of a list 8 having a plurality of list entries 9, of which only a portion is shown. As will be explained later, additional element may be displayed that belong to a list entry 9. The number of list entries 9 of the displayed portion depends on the magnification factor for the display of list 8. FIG. 2A shows the case in which the magnification factor is selected such that a total of six list entries 9 of list 8 are displayed in display area 2. The displayed portion may only be changed by an operator action of a user. The user may in particular produce a scrolling action. For this purpose, successive display images are represented in display area 2, in which list entries 9 disappear and other list entries are displayed consecutively. If the user, starting from the display of FIG. 2A, scrolls downward for example, initially first list entry 9 disappears and, following the sixth list entry 9, the seventh list entry appears. Second list entry 9 disappears thereafter and the seventh list entry is followed by the appearance of the eight list entry, etc.

The magnitude or the speed of the scrolling action depends on the one hand on the operator action described later and on the other hand on the magnification factor of the displayed information. The speed of the scrolling action, i.e. the change of the displayed portion, is understood in this case as the rate at which a list entry disappears and another list entry is displayed in its stead per unit of time. The rate of the change increases as the magnification factor decreases, i.e. as the size of the displayed portion of the total information decreases, i.e. as the number of list entries 9 displayed in display area 2 increases.

In the exemplary embodiment of the method, the magnification factor for the operator action, i.e. in the present case for the scrolling action, may be changed as a function of an operating situation to be described later. If control unit 3 ascertains from the operating situation that the magnification factor for the scrolling action is to be reduced for example, then control unit 3 produces appropriate graphic data such that the displayed portion of the total information is displayed in display area 2 at a smaller magnification factor. This usually has the result that the portion contains more information. In the present example, more list entries are displayed when the magnification factor is reduced. FIG. 2B shows the case in which the magnification factor for the scrolling action was reduced such that twelve list entries 9 are displayed.

Since the speed of the scrolling action depends on the magnification factor, a quicker scrolling action is performed in a predefined operator action following the reduction of the magnification factor, as shown in FIG. 2B, than would be the case in the representation shown in FIG. 2A. As a function of an operating situation, the user is thus able to produce a quicker scrolling action by a specific operator action and thus scroll more quickly through list 8.

Following the termination of the operator action, the magnification factor is reset to the original value, at which six list entries 9 are shown by display area 2 in the present example. In order to make it clear in the representation at the reduced magnification factor, as shown in FIG. 2B, which list entries are displayed following the reset of the magnification factor, a frame 10 is indicated in the representation at the reduced magnification factor, which contains the list entries 9 displayed following the reset of the magnification factor.

In the following, various operator actions are described that result in a scrolling action through list 8. These operator actions are furthermore characterized by the fact that they also determine the operating situation, which results in a change, in particular a reduction, of the magnification factor that determines the speed of the scrolling action.

If display device 1 is arranged as a multi-touch screen, as explained with reference to FIG. 1, then the operator action may be e.g. a so-called multi-touch zoom, in which the user touches surface 5 of display area 2 simultaneously using two fingers and moves the areas, where he touches surface 5, away from each other (zoom in) or towards each other (zoom out). The input produced by this multi-touch gesture is able to change the magnification factor either steplessly as a function of the measure of how far the areas were moved towards each other or away from each other. Alternatively, possible magnification factors may be predefined, which are selected as a function of the measure of how far the areas were moved away from each other or towards each other.

After a certain time interval of e.g. three seconds, within which no manual interaction has occurred with touch-sensitive surface 5, the magnification factor is again reset to the original value. Likewise, when selecting a list entry 9, the representation is reset to the original magnification factor, the selected list entry 9 being represented centrally in display area 2, and the elements 7 associated with selected list entry 9 being displayed, as will be explained later.

The scrolling action within list 8 may either also be produced by the multi-touch zoom gesture or by a separate actuation of touch-sensitive surface 5. It is possible, for example, for control unit 3 to interpret the direction (vertical or horizontal or diagonal), in which the areas, in which the fingers touch touch-sensitive surface 5, are moved towards each other, in such a way that a scrolling action is to occur in list 8 upwards or downwards. On the other hand, following the multi-touch zoom gesture, a shifting gesture may be performed on touch-sensitive surface 5, in which the user moves the fingertip upwards or downwards across touch-sensitive surface 5, which results in an upward or downward scrolling action. If the user for example moves his fingertip a certain distance downwards on touch-sensitive surface 5, which distance has a length vertically on display area 2 corresponding to e.g. three list entries, then the displayed portion of list 8 would change by three entries in the representation of FIG. 2A. Since in the method, however, the magnification factor has changed for the scrolling action, as shown in FIG. 2B, the same operator action, i.e. a movement of the fingertip on touch-sensitive surface 5 over the same distance, results in this case in a change of displayed list entries 9 by seven positions since in the case of the reduced magnification factor, as is shown in FIG. 2B, the respective distance corresponds to seven list entries 9. Using a predefined operator movement of the operator action, the user is thus able to produce a much quicker scrolling action since the magnification factor was reduced for the operator action. Likewise, a corresponding operator movement when performing the multi-touch zoom gesture may result in a proportionally quicker scrolling action.

For producing the scrolling action, it is furthermore possible for the user to touch buttons on touch-sensitive surface 5, appropriate symbols being displayed for the buttons in display area 2. In this case, the magnitude or speed of the change of the portion, i.e. the displayed list entries 9, may change as a function of the duration of the touch of these buttons. In this case too, a specific duration of actuating the buttons produces a quicker scrolling action since the magnification factor is reduced for the scrolling action, as shown in FIG. 2B.

According to another example, the user performs a so-called multi-touch drag gesture as an operator action on touch-sensitive surface 5 of display area 2, in which the user touches touch-sensitive surface 5 simultaneously with two fingertips and moves the touched areas simultaneously into one direction. In the example shown in FIGS. 2A and 2B, the user is able for example to touch a list entry simultaneously using two fingers and then two move the two fingertips upwards. In this case, on the one hand, the simultaneous touch of two areas of list entry 9 is interpreted as an operating situation that results in a reduction of the magnification factor. If the user had touched the list entry using only one finger, the magnification factor would not change. The extent of the movement of the two fingertips that touch the touch-sensitive surface 5 determines, in addition to the magnification factor, also the magnitude or measure of the change of the displayed information, i.e. by how many list entries 9 the displayed portion of list 8 changes. If the user releases touch-sensitive surface 5 of display area 2, the representation is automatically reset to the original magnification factor.

In another example, the operating device does not use a touch-sensitive surface 5 of display area 2, but a mechanical operating element. A rotary actuator may be used to produce a scrolling action through list 8 for example. In this case, control unit 3 may interpret a quick rotation or a repeated quick rotation of the rotary actuator as an operating situation such that the magnification factor for representing list 8 is reduced as shown in FIG. 2B. In this case, a quick rotation is understood as one in which at least a defined number of increments of the rotary actuator is run through within a predefined time interval of e.g. 100 ms. The number of list entries by which the displayed portion of list 8 changes may be determined from the angle of rotation at which the rotary actuator was turned. In this case, the change at a certain angle of rotation increases as the magnification factor for the scrolling action decreases. When the rotary actuator is released, which may be detected via an infrared-based or capacitive touch sensor system, or when no other interaction occurs via the rotary actuator within a certain time interval of e.g. three seconds, then the magnification factor is automatically reset to the original value, and the changed portion of list 8 is displayed in display area 2. Likewise, when selecting a list entry 9, the magnification factor is reset and the selected list entry is placed centrally in display area 2.

Furthermore, a very long or frequent pressing action on a mechanical operating element or a virtual button, as shown in display area 2 with a touch-sensitive surface 5, may be interpreted as an operating situation. If, for example, a mechanical operating element or a button is permanently actuated during a time interval of e.g. 100 ms or is actuated multiple times within a time interval of e.g. one second, then the magnification factor for representing list 8 is reduced either in discrete steps or in accordance with the duration of the interaction. When the mechanical operating element is released or when there is no further interaction via the operating element for e.g. three seconds, then the magnification factor is automatically reset to the initial value. Likewise, when selecting a list entry 9, the magnification factor is reset and the selected list entry 9 is placed centrally in display area 2.

Figure 3:
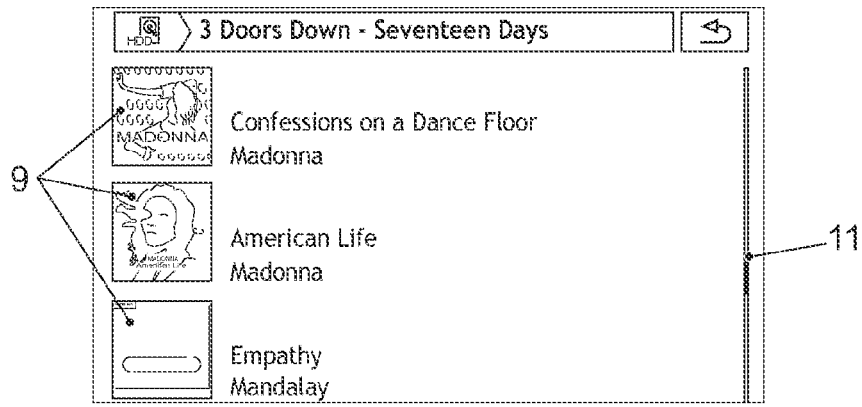
FIGS. 3 to 5 show further displays of the display device according to the method of an example embodiment of the present invention.

In another exemplary embodiment, as explained above, the operating device having a pressure-sensitive surface 12 is used, as is shown in FIG. 3 for example. In this case, a particularly forceful pressing action on one of operating elements 13 through 16 may be interpreted as an operating situation. The magnification factor for representing list 8, as shown in FIG. 2B, is thus reduced when the force exerted on operating elements 13 through 16 exceeds a certain threshold value, which may be stored in memory 4. Once the magnification factor has been changed, the list is scrolled upwards, for example, when actuating a first operating element, or is scrolled downwards when actuating a second operating element. After the operating elements are released, the magnification factor for representing list 8 is reset to the original value.

In this example, the measure by which the magnification factor is changed when exceeding the threshold value for the exerted force may depend on the exerted force. For example, the magnification factor may be reduced in proportion to which the exerted force is increased. Finally, the scroll speed may also be a function of the force exerted on the operating elements independently of exceeding a threshold value. For example, the speed with which the displayed portion of the total information changes may be determined as follows:

In control unit 3, the force exerted on the operating device under normal circumstances is divided into ranges. The limits of the ranges thus represent threshold values. A speed value is associated with each range such that with a rising force the speed is increased in discrete steps as the range limits are exceeded. The exertable force may be divided into four ranges for example.

Alternatively, the speed may also change in a linear manner with the exerted force such that the following correlation holds:

$$v = F \cdot D,$$

where v is the speed, F the exerted force and D an attenuation factor that is stored in control unit 3 or memory 4.

The operating situation may be independent of the operator action. The reduction of the magnification factor may depend on the speed of the vehicle for example. At higher vehicle speeds, the representation of list 8 may be reduced more such that a certain operator movement or operation duration results in a greater change of the displayed portion of list 8. For when the driver of the vehicle performs the operator action, it is particularly important at high speeds that he be able to scroll through e.g. a very long list particularly quickly.

Figure 4:
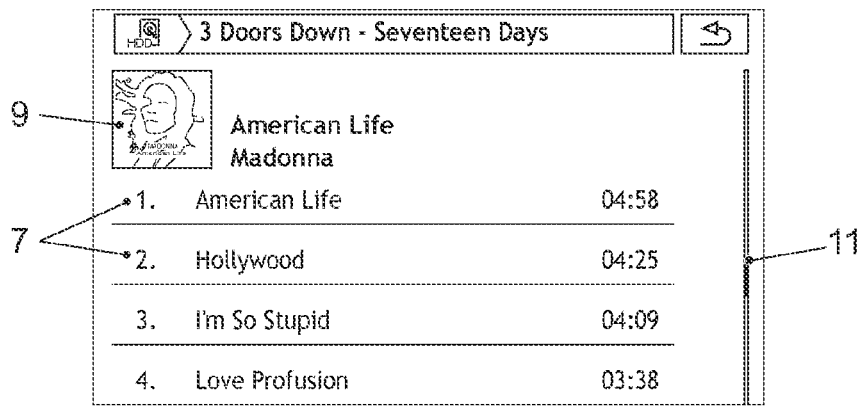
Figure 5:
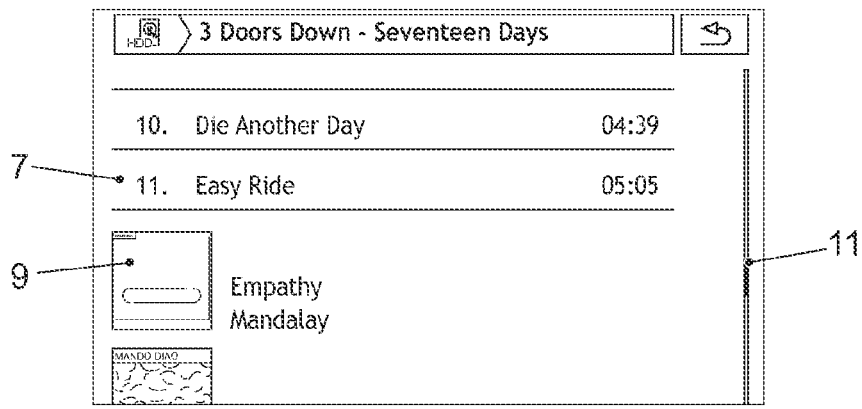

With reference to FIGS. 3 through 5, the following will explain how the display in display area 2 changes when a list entry 9 is selected. In this case, music albums of various artists are chosen as list entries 9. Various songs are associated with each album. These songs represent the elements 7, which are respectively associated with a specific list entry 9.

FIG. 3 shows three albums of various artists as list entries 9. Since additional albums are stored in memory 4, only a portion of a total list is displayed. List entries 9 are provided as selectable buttons. The bar 11 on the right edge of display area 2 indicates visually which portion of the total list is currently displayed in display area 2. By a scrolling action, the user is able to scroll through list entries 9, i.e. the music albums of the total list. For this purpose, the above-described method may be applied, in which the magnification factor for the scrolling action is changed, in particular reduced. It is also possible, however, to perform the scrolling action in a traditional manner, i.e. without changing the magnification factor. When selecting a specific list entry 9, one obtains the display in display area 2 represented in FIG. 4.

Selected list entry 9, in this case the album "American Life" by the artist Madonna, continues to be displayed. In addition, the elements 7 associated with this list entry 9 are displayed, i.e. in this case the songs of this album. In this instance, only a portion of elements 7 is displayed since display area 2 is not sufficiently large to display all elements 7 that belong to the selected list entry 9. In order to display additional elements 7, the user may scroll downwards. For this purpose too, the above-described method may be applied, in which the magnification factor for the scrolling action is changed, in particular reduced. It is also possible, however, to perform the scrolling action in a traditional manner, i.e. without changing the magnification factor.

If the scrolling action proceeded so far downward that the final element 7 of selected list entry 9 is displayed, as is shown in FIG. 5, then a list entry 9 is displayed below final element 7, which follows upon selected list entry 9. The list as a whole is thus not masked out in the display of the elements 7 of a selected list entry 9, but is expanded by the elements 7 of selected list entry 9 such that a scrolling action scrolls through both list entries 9 as well as the elements 7 of a selected list entry 9. For this purpose, the list entries and elements are displayed successively in a linear representation.

If, starting from the representation shown in FIG. 4, one scrolls downwards or upwards and subsequently selects a different list entry 9, on the one hand the elements of this newly selected list entry 9 are shown and inserted into the list as a whole. On the other hand, the elements 7 of the previously selected list entry 9 are masked out, i.e. are no longer displayed in the list as a whole.

LIST OF REFERENCE NUMERALS

1 Display Device
2 Display Area
3 Control Unit
4 Memory
5 Touch-sensitive Surface
6 Vehicle Bus
7 Element
8 List
9 List Entry
10 Frame
11 Bar

What is claimed is:

1. A method for displaying information arranged in lists on a display device of a vehicle, the display device having a display area, comprising:

displaying a portion of a list in the display area that includes a plurality of list entries, multiple elements being associated at least in part with the list entries, wherein the list entries comprise music albums and the elements comprise songs, and wherein the number of displayed list entries or elements depends on a magnification factor at which the list entries or elements are displayed in the display area;

modifying the displayed portion of the list by a scrolling action such that previous and subsequent list entries are displayable in succession, wherein a magnitude of the modification increases as the magnification factor decreases; and displaying, in a selection of a list entry, the list entry together with at least a portion of the elements associated with the list entry;

wherein, if a selected list entry is displayed together with at least a portion of the elements associated with the selected list entry and the scrolling action is performed, first one of (a) previous and (b) subsequent elements are displayed in succession and thereafter list entries one of (a) preceding and (b) following the selected list entry are displayed;

wherein the scrolling action and a reduction of the magnification factor are both initiated in response to an operator gesture;

wherein, during the scrolling action, the magnification factor is:

reduced if the gesture includes two simultaneous points of a touch-sensitive surface of the display area or a touch-sensitive surface of an operating device for the display area touched by the operators;

reduced according to the current speed of the vehicle, in which the magnification factor is reduced to a greater extent at higher vehicle speeds, and reduced to a lesser extent at lower vehicle speeds;

reduced according to the length of the gesture touching of the touch-sensitive surface of the display area or the touch sensitive surface of the operating device, in which the magnification factor is reduced to a greater extent if the gesture includes longer touching, and reduced to a lesser extent if the gesture includes shorter touching;

reduced according to the frequency of the gesture touching of the touch-sensitive surface of the display area or the touch sensitive surface of the operating device, in which the magnification factor is reduced to a greater extent if the gesture includes more frequent touching, and reduced to a lesser extent if the gesture includes less frequent touching; and reduced if the gesture exerts a pressure on the touch-sensitive surface of the display area or the touch sensitive surface of the operating device in excess of a threshold value; and wherein, upon termination of the scrolling action, the magnification factor is reset to an original value.

2. The method according to claim 1, wherein the list entries and the elements are displayed successively in a linear representation.

3. The method according to claim 2, wherein the scrolling action scrolls through the list entries and the elements of a selected list entry.

4. The method according to claim 1, wherein one of (a) the list entries and (b) the elements are displayed successively in a linear representation.

5. The method according to claim 4, wherein the scrolling action scrolls through one of (a) the list entries and (b) the elements of a selected list entry.

6. The method according to claim 1, wherein after a last element of a selected list entry, the list entry following upon the selected list entry is displayed.

7. The method according to claim 1, wherein, if a selected list entry is displayed together with at least a portion of the elements associated with the selected list entry and subsequently another list entry is selected, then the other list entry is displayed together with at least a portion of the elements associated with the other list entry, and the elements of the previously selected list entry are no longer displayed.

8. The method according to claim 1, wherein the scrolling speed changes based on the magnification factor.

9. A device for displaying information arranged in lists, comprising:

a display device of a vehicle having a display area;

a memory adapted to store a list that includes a plurality of list entries, of which a portion is displayable in the display area, and to store elements associated with the list entries, wherein the list entries comprise music albums and the elements comprise songs, and wherein the number of displayable list entries or elements depends on a magnification factor at which the list entries or elements are displayable in the display area;

an operation device actuatable by an operator to change a displayed portion of the list by a scrolling action, the entries of the list being run through consecutively by the scrolling action, wherein a magnitude of the change increases as the magnification factor decreases; and a control unit coupled with the operation device and the display device, the control unit adapted to control the display shown in the display area;

wherein a control device is adapted to control the display area such that, if a selected list entry is displayed together with at least a portion of the elements associated with the selected list entry and the scrolling action is performed using the operation device, first one of (a) previous and (b) subsequent elements are displayed in succession in the display area, and thereafter list entries one of (a) preceding and (b) following the selected list entry are displayable;

wherein the control device is adapted to control the display such that the scrolling action and a reduction of the magnification factor are both initiated in response to an operator gesture;

wherein the control unit is adapted to control the display area such that, during the scrolling action, the magnification factor is:

reduced if the gesture includes two simultaneous points of a touch-sensitive surface of the display area or a touch-sensitive surface of an operating device for the display area touched by the operator;

reduced according to the current speed of the vehicle, in which the magnification factor is reduced to a greater extent at higher vehicle speeds, and reduced to a lesser extent at lower vehicle speeds;

reduced according to the length of the gesture touching of the touch-sensitive surface of the display area or the touch sensitive surface of the operating device, in which the magnification factor is reduced to a greater extent if the gesture includes longer touching, and reduced to a lesser extent if the gesture includes shorter touching;

reduced according to the frequency of the gesture touching of the touch-sensitive surface of the display area or the touch sensitive surface of the operating device, in which the magnification factor is reduced to a greater extent if the gesture includes more frequent touching, and reduced to a lesser extent if the gesture includes less frequent touching; and reduced if the gesture exerts a pressure on the touch-sensitive surface of the display area or the touch sensitive surface of the operating device in excess of a threshold value; and wherein the control unit is adapted such that, upon termination of the scrolling action, the magnification factor is reset to an original value.

10. The device according to claim 9, wherein the control unit is adapted to display the list entries and the elements in the display area successively in a linear representation.

11. The device according to claim 10, wherein the control unit is adapted such that the scrolling action scrolls through the list entries and the elements of a selected list entry.

12. The device according to claim 9, wherein the control unit is adapted to display (a) the list entries or (b) the elements in the display area successively in a linear representation.

13. The device according to claim 12, wherein the control unit is configured such that the scrolling action scrolls through (a) the list entries or (b) the elements of a selected list entry.

14. The device according to claim 9, wherein the control unit is adapted such after a last element of a selected list entry the list entry following the selected list entry is displayed.

15. The device according to claim 9, wherein the control unit is adapted such that, if a selected list entry is displayed together with at least a portion of the elements associated with the selected list entry and subsequently another list entry is selected, then the other list entry is displayed together with at least a portion of the elements associated with the other list entry, and the elements of a previously selected list entry are no longer displayed.

16. The device according to claim 9, wherein the scrolling speed changes based on the magnification factor.

17. A method for displaying information sorted in lists on a display device of a vehicle, the display device having a display area, the method comprising:
 displaying on a display surface a subset of a list having a plurality of list entries, each list entry being respectively assigned a plurality of elements,
 changing the displayed subset of the list by a scrolling operation so that successively preceding or following list entries are displayed, wherein a magnitude of the change increases as a magnification factor at which the list entries or elements are displayed decreases; and
 given a selection of a list entry, displaying said selected list entry together with at least a subset of the elements assigned to the list entry,
 wherein when a selected list entry is displayed together with at least a subset of the elements assigned to the selected list entry, and the scrolling operation is executed, successively preceding or following elements are displayed, and thereafter, list entries preceding or following in relation to the selected list entry are displayed;
 wherein the scrolling action and a reduction of the magnification factor are both initiated in response to an operator gesture;
 wherein, during the scrolling operation, the magnification factor is
  reduced if the gesture includes two simultaneous points of a touch-sensitive surface of the display area or a touch-sensitive surface of an operating device for the display area touched by the operator;
  reduced according to the current speed of the vehicle, in which the magnification factor is reduced to a greater extent at higher vehicle speeds, and reduced to a lesser extent at lower vehicle speeds;
  reduced according to the length of the gesture touching of the touch-sensitive surface of the display area or the touch sensitive surface of the operating device, in which the magnification factor is reduced to a greater extent if the gesture includes longer touching, and reduced to a lesser extent if the gesture includes shorter touching;
  reduced according to the frequency of the gesture touching of the touch-sensitive surface of the display area or the touch sensitive surface of the operating device, in which the magnification factor is reduced to a greater extent if the gesture includes more frequent touching, and reduced to a lesser extent if the gesture includes less frequent touching; and
  reduced if the gesture exerts a pressure on the touch-sensitive surface of the display area or the touch sensitive surface of the operating device in excess of a threshold value; and
 wherein, upon termination of the scrolling action, the magnification factor is reset to an original value.

18. The method according to claim 17, wherein the list entries and/or the elements are displayed succeeding one another in a linear representation.

19. The method according to claim 17, wherein a list entry following a selected list entry is displayed after the last element of the selected list entry.

20. The method according to claim 17, wherein when a selected list entry is displayed together with at least a subset of the elements assigned to the selected list entry and another list entry is subsequently selected, the other list entry is displayed together with at least a subset of the elements assigned to the other list entry, and the elements of the previously selected list entry are no longer displayed.

21. The method according to claim 17, wherein the scrolling operation scrolls through the list entries and/or the elements of a selected list entry.

* * * * *